United States Patent
Zhou et al.

(10) Patent No.: US 9,891,776 B2
(45) Date of Patent: Feb. 13, 2018

(54) ELECTROMAGNETIC TOUCH DISPLAY DEVICE AND METHOD FOR MANUFACTURING THE SAME

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Xiaoliang Zhou, Beijing (CN); Lixia Yu, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 211 days.

(21) Appl. No.: 14/422,330

(22) PCT Filed: May 23, 2014

(86) PCT No.: PCT/CN2014/078279
§ 371 (c)(1),
(2) Date: Feb. 18, 2015

(87) PCT Pub. No.: WO2015/058522
PCT Pub. Date: Apr. 30, 2015

(65) Prior Publication Data
US 2016/0026301 A1    Jan. 28, 2016

(30) Foreign Application Priority Data
Oct. 23, 2013 (CN) .......................... 2013 1 0504844

(51) Int. Cl.
*G06F 3/041* (2006.01)
*G06F 3/046* (2006.01)
*G06F 3/0354* (2013.01)

(52) U.S. Cl.
CPC .......... *G06F 3/046* (2013.01); *G06F 3/03545* (2013.01); *G06F 3/0412* (2013.01); *G06F 2203/04103* (2013.01)

(58) Field of Classification Search
CPC .... G06F 3/03545; G06F 3/0412; G06F 3/046; G06F 2203/04103; G06F 2203/04112;
(Continued)

(56) References Cited

U.S. PATENT DOCUMENTS

2004/0189587 A1* 9/2004 Jung ................... G02F 1/13338
345/102
2005/0280637 A1* 12/2005 Ikeda ..................... G02B 3/005
345/173
(Continued)

FOREIGN PATENT DOCUMENTS

CN          1534333 A     10/2004
CN        201438247 U      4/2010
(Continued)

OTHER PUBLICATIONS

Office Action in Chinese Patent Application No. 2013105048445, dated Nov. 18, 2015.
(Continued)

*Primary Examiner* — Pegeman Karimi
(74) *Attorney, Agent, or Firm* — Brooks Kushman P.C.

(57) ABSTRACT

The present disclosure provides an electromagnetic touch display device and a method for manufacturing the same. The electromagnetic touch display device includes a display device and an electromagnetic stylus. The display device includes an array substrate, a color filter substrate, a grid array electromagnetic induction layer and a control circuit. The grid array electromagnetic induction layer is arranged on the array substrate or the color filter substrate. The control circuit is connected to the grid array electromagnetic induc-
(Continued)

tion layer and configured to detect position information of the electromagnetic stylus on the grid array electromagnetic induction layer.

14 Claims, 2 Drawing Sheets

(58) Field of Classification Search
CPC ... G06F 3/01; G06F 3/04; G06F 3/033; G06F 3/02; G06F 3/041; G06F 3/045; G09G 5/00; G09G 5/08
See application file for complete search history.

(56) References Cited

U.S. PATENT DOCUMENTS

| | | | | |
|---|---|---|---|---|
| 2008/0062140 | A1* | 3/2008 | Hotelling | G09G 3/3648 345/173 |
| 2011/0090146 | A1* | 4/2011 | Katsurahira | G06F 3/03545 345/156 |
| 2011/0298733 | A1* | 12/2011 | Chen | G06F 3/03545 345/173 |
| 2011/0304571 | A1* | 12/2011 | Kim | G02F 1/13338 345/173 |
| 2012/0154326 | A1* | 6/2012 | Liu | G06F 3/0412 345/174 |
| 2012/0169400 | A1* | 7/2012 | Liu | G06F 3/0416 327/517 |
| 2012/0169635 | A1* | 7/2012 | Liu | G06F 3/0412 345/173 |
| 2012/0169636 | A1* | 7/2012 | Liu | G06F 3/0412 345/173 |
| 2012/0218198 | A1* | 8/2012 | Shin | G06F 3/0412 345/173 |
| 2013/0241873 | A1* | 9/2013 | Kim | H05K 1/0228 345/174 |
| 2013/0341651 | A1* | 12/2013 | Kim | H01L 31/0232 257/84 |
| 2016/0054835 | A1* | 2/2016 | Heo | G06F 3/0412 345/173 |
| 2016/0109988 | A1* | 4/2016 | Wang | G06F 3/046 345/173 |

FOREIGN PATENT DOCUMENTS

| | | |
|---|---|---|
| CN | 102053408 A | 5/2011 |
| CN | 102163112 A | 8/2011 |
| CN | 102541349 A | 7/2012 |
| CN | 102541384 A | 7/2012 |
| CN | 102609128 A | 7/2012 |
| CN | 102646005 A | 8/2012 |
| CN | 203025679 U | 6/2013 |
| CN | 103543899 A | 1/2014 |
| CN | 203561977 U | 4/2014 |
| JP | 2007-047920 A | 2/2007 |

OTHER PUBLICATIONS

International Search Report and Written Opinion in PCT International Application No. PCT/CN2014/078279, dated Sep. 5, 2014.

* cited by examiner

ELECTROMAGNETIC TOUCH DISPLAY DEVICE AND METHOD FOR MANUFACTURING THE SAME

CROSS-REFERENCE TO RELATED APPLICATION

This application is the U.S. national phase of PCT Application No. PCT/CN2014/078279 filed on May 23, 2014, which claims a priority of the Chinese Patent Application No. 201310504844.5 filed on Oct. 23, 2013, the disclosures of which are incorporated in their entirety by reference herein.

TECHNICAL FIELD

The present disclosure relates to the field of the electromagnetic touch display technology, in particular to an electromagnetic touch display device and a method for manufacturing the same.

BACKGROUND

Along with the popularization and wide application of computer technology, there are more and more ways for the electronization and digitalization of information. Various peripherals of a computer may be used so as to perform an initial digitalization procedure for the information processing. As one of these peripherals, an electromagnetic stylus is directly used to touch or click a liquid crystal display screen, so as to input information and call instructions. Along with the launch of portable products, such peripherals as keyboard and mouse have been omitted, and an operation is made almost without any buttons. Instead, the electromagnetic stylus is used to perform the operations on a touch screen.

For an existing electromagnetic touch display device, it does not include any electromagnetic touch function, and an electromagnetic induction layer is required to be added at a back surface of the display device. However, this external electromagnetic induction layer will easily be offset, thereby it is impossible to perform position control and touch control accurately.

SUMMARY

A main object of the present disclosure is to provide an electromagnetic touch display device and a method for manufacturing the same, so as to prevent an additional electromagnetic induction layer at a back surface of an existing display device due to its lack of an electromagnetic control function, and to prevent inaccurate position control and touch control due to alignment offset of the external electromagnetic induction layer.

In one aspect, the present disclosure provides an electromagnetic touch display device, including a display device and an electromagnetic stylus. The display device includes an array substrate, a color filter substrate, a grid array electromagnetic induction layer and a control circuit. The grid array electromagnetic induction layer is arranged on the array substrate or the color filter substrate. The control circuit is connected to the grid array electromagnetic induction layer and configured to detect position information of the electromagnetic stylus on the grid array electromagnetic induction layer.

Alternatively, the grid array electromagnetic induction layer may include a plurality of X-axis loop coils formed on the array substrate and a plurality of Y-axis loop coils insulated from the X-axis loop coils.

Alternatively, the grid array electromagnetic induction layer may include a plurality of X-axis loop coils formed on the color filter substrate and a plurality of Y-axis loop coils insulated from the X-axis loop coils.

Alternatively, the control circuit may include an X-axis receiver, a Y-axis receiver, a coil switch, a high-frequency AC signal generator and a position information detector. First ends of the plurality of Y-axis loop coils are supplied with a reference voltage, and first ends of the plurality of X-axis loop coils are supplied with a reference voltage. The high-frequency AC signal generator is connected to a second end of one or more Y-axis loop coils via the coil switch and configured to output an AC current to the Y-axis loop coils at a charging stage. The position information detector is connected to second ends of the plurality of X-axis loop coils via the X-axis receiver and to second ends of the plurality of Y-axis loop coils via the Y-axis receiver, and configured to determine the position information of the electromagnetic stylus on the grid array electromagnetic induction layer by detecting voltages of the plurality of X-axis loop coils and the plurality of Y-axis loop coils after the charging stage.

Alternatively, the control circuit may include an X-axis receiver, a Y-axis receiver, a coil switch, a high-frequency AC signal generator and a position information detector. First ends of the plurality of Y-axis loop coils are supplied with a reference voltage, and first ends of the plurality of X-axis loop coils are supplied with a reference voltage. The high-frequency AC signal generator is connected to a second end of one or more X-axis loop coils via the coil switch, and configured to output an AC current to the X-axis loop coils at a charging stage. The position information detector is connected to the second ends of the plurality of X-axis loop coils via the X-axis receiver and to second ends of the plurality of Y-axis loop coils via the Y-axis receiver, and configured to determine the position information of the electromagnetic stylus on the grid array electromagnetic induction layer by detecting voltages of the plurality of X-axis loop coils and the plurality of Y-axis loop coils after the charging stage.

Alternatively, the control circuit may include an X-axis receiver, a Y-axis receiver, a coil switch, a high-frequency AC signal generator and a position information detector. First ends of the plurality of Y-axis loop coils are supplied with a reference voltage, and first ends of the plurality of X-axis loop coils are supplied with a reference voltage. The high-frequency AC signal generator is connected to a second end of one or more Y-axis loop coils via the coil switch and to a second end of one or more X-axis loop coils via the coil switch, and configured to output an AC current to the Y-axis loop coils and the X-axis loop coils at a charging stage. The position information detector is connected to the second ends of the plurality of X-axis loop coils via the X-axis receiver and to the second ends of the plurality of Y-axis loop coils via the Y-axis receiver, and configured to determine the position information of the electromagnetic stylus on the grid array electromagnetic induction layer by detecting voltages of the plurality of X-axis loop coils and the Y-axis loop coils after the charging stage.

Alternatively, the control circuit may be arranged on a printed circuit board, and an electromagnetic signal processing interface of the grid array magnetic induction layer is connected to the control circuit provided on the printed circuit board via a flexible circuit board.

In another aspect, the present disclosure provides a method for manufacturing an electromagnetic touch display device, including a step of arranging a grid array electromagnetic induction layer on an array substrate or a color filter substrate.

Alternatively, the step of arranging the grid array electromagnetic induction layer on the array substrate may include:

forming a plurality of X-axis loop coils on a glass substrate of the array substrate;

forming a passivation insulation layer on the plurality of X-axis loop coils; and forming a plurality of Y-axis loop coils on the passivation insulating layer.

Alternatively, the step forming the plurality of X-axis loop coils on the glass substrate of the array substrate may include forming the plurality of X-axis loop coils by coating an indium tin oxide (ITO) material onto the glass substrate. The step of forming the plurality of Y-axis loop coils on the passivation insulating layer may include forming the plurality of Y-axis loop coils by coating an ITO material onto the passivation insulation layer.

Alternatively, the step of arranging the grid array electromagnetic induction layer on the color filter substrate may include:

forming a plurality of X-axis loop coils on a glass substrate of the color filter substrate;

forming a passivation insulation layer on the plurality of X-axis loop coils; and forming a plurality of Y-axis loop coils on the passivation insulation layer.

Alternatively, the step of forming the plurality of X-axis loop coils on the glass substrate of the array substrate may include forming the plurality of X-axis loop coils by coating an ITO material onto the glass substrate. The step of forming the plurality of Y-axis loop coils on the passivation insulation layer may include forming the plurality of Y-axis loop coils by coating an ITO material onto the passivation insulation layer.

According to the electromagnetic touch display device and its manufacturing method of the present disclosure, the grid array electromagnetic induction layer is arranged on the array substrate or the color filter substrate of the display device, i.e., the electromagnetic induction layer is built inside the display device, so as to provide the display device with an electromagnetic touch function, without any need to add an electromagnetic induction layer at a back surface of the display device. As a result, it is able to prevent alignment offset of the external electromagnetic induction layer, thereby to perform the position control and touch control accurately. In addition, because the grid array electromagnetic induction layer is built inside the display device in the present disclosure, the electromagnetic signal processing interface may be integrated with a signal interface of the display device, and as a result, it is able to achieve integration of the interfaces of the electromagnetic touch display device, reduce the number of system matching interfaces and simplify the structure, thereby to reduce the production cost and provide a thinner and lighter product.

DETAILED DESCRIPTION

Figure 1:
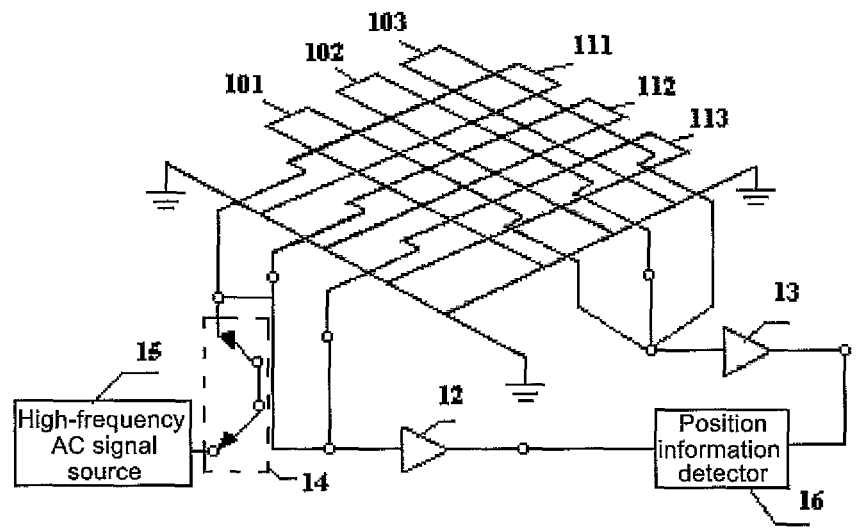
FIG. 1 is a schematic view showing a grid array electromagnetic induction layer and a control circuit included in an electromagnetic touch display device according to an embodiment of the present disclosure.

The present disclosure will be described hereinafter in a clear and complete manner in conjunction with the drawings and the embodiments. Obviously, the following embodiments are merely a part of, rather than all of, the embodiments of the present disclosure. Based on these embodiments, a person skilled in the art may obtain the other embodiments without any creative effort, and they also fall within the scope of the present disclosure.

The present disclosure provides in an embodiment an electromagnetic touch display device, which includes a display device and an electromagnetic stylus. The display device includes an array substrate, a color filter substrate, a grid array electromagnetic induction layer and a control circuit. The grid array electromagnetic induction layer is arranged on the array substrate or the color filter substrate. The control circuit is connected to the grid array electromagnetic induction layer and configured to detect position information of the electromagnetic stylus on the grid array electromagnetic induction layer.

According to the electromagnetic touch display device of the present disclosure, the grid array electromagnetic induction layer is arranged on the array substrate or the color filter substrate of the display device, i.e., the electromagnetic induction layer is built inside the display device, so as to provide the display device with an electromagnetic touch function, without any need to add an electromagnetic induction layer at a back surface of the display device. As a result, it is able to prevent alignment offset of the external electromagnetic induction layer, thereby to perform the position control and touch control accurately. In addition, because the grid array electromagnetic induction layer is built inside the display device in the present disclosure, an electromagnetic signal processing interface may be integrated with a signal interface of the display device, and as a result, it is able to achieve integration of the interfaces of the electromagnetic touch display device, reduce the number of system matching interfaces and simplify the structure, thereby to reduce the production cost and provide a thinner and lighter product.

The grid array electromagnetic induction layer made of ITO is coated onto the color filter substrate, so as to reduce a layer number of coatings on the array substrate and prevent mutual interference of electric signals at one side of the array substrate. A signal transmitted through ITO on the color filter substrate is also required to be transmitted through the array substrate, so an additional conductive adhesive is desired so as to electrically connect relevant conductive layers on the color filter substrate and the array substrate. For example, the relevant conductive layers may include a gate metal (Gate) layer, a source/drain metal layer (S/D layer) and an ITO layer. The ITO layer on the color filter substrate, i.e., the grid array electromagnetic inductor layer, is connected to the ITO layer on the array substrate via the conductive adhesive containing metallic balls in a connecting line form, but not connected to an ITO layer at an LCD display region. The ITO layer on the array substrate is connected to FPC after FPC Bonding, and then connected to a PCB. As a result, the signal generated by the grid array electromagnetic induction layer on the color filter substrate can be transmitted to a control system via the metallic balls, the ITO layer on the array substrate, the FPC and the PCB. Upper and lower conductive layers are electrically connected to each other when the metallic balls are in contact with them.

In the electromagnetic touch display device according to an embodiment, the grid array electromagnetic induction layer may include a plurality of X-axis loop coils formed on the array substrate and a plurality of Y-axis loop coils insulated from the X-axis loop coils.

In the electromagnetic touch display device of this embodiment, a plurality of transverse (X-axis) loop coils is formed by coating ITO on the array substrate or the color filter substrate in the display device, a passivation insulation is then coated on the plurality of transverse loop coils, and then a plurality of longitudinal (Y-axis) loop coils is formed by coating ITO on the passivation insulation layer, so as to form the grid array electromagnetic induction layer consisting of loop coils in different directions and at different layers. The grid array electromagnetic induction layer is connected to the control circuit. When an AC current is supplied, the electromagnetic stylus is charged, and when the supply of the AC current is ceased, the electric energy stored in the magnetic stylus is released, thus the grid array electromagnetic induction layer scans and receives the electric energy from the electromagnetic stylus so as to determine a position of the electromagnetic stylus, thereby to achieve the electromagnetic induction touch.

As shown in FIG. 1, in the electromagnetic touch display device of a specific embodiment, the grid array electromagnetic induction layer may include:

a first X-axis loop coil 101, a second X-axis loop coil 102 and a third X-axis loop coil 103 formed by coating an ITO material onto the array substrate;

a passivation insulation layer (not shown) coated onto the first X-axis loop coil 101, the second X-axis loop coil 102 and the third X-axis loop coil 103; and a first Y-axis loop coil 101, a second Y-axis loop coil 102 and a third Y-axis loop coil 103 formed by coating an ITO material onto the passivation insulation layer.

In the electromagnetic touch display device of this embodiment, the control circuit may include an X-axis receiver, a Y-axis receiver, a coil switch, a high-frequency AC signal generator and a position information detector. First ends of the plurality of Y-axis loop coils are supplied with a reference voltage, and first ends of the plurality of X-axis loop coils are supplied with a reference voltage. The high-frequency AC signal generator is connected to a second end of one or more Y-axis loop coils via the coil switch and configured to output an AC current to the Y-axis loop coils at a charging stage. The position information detector is connected to second ends of the plurality of X-axis loop coils via the X-axis receiver and to the second ends of the plurality of Y-axis loop coils via the Y-axis receiver, and configured to determine the position information of the electromagnetic stylus on the grid array electromagnetic induction layer by detecting voltages of the plurality of X-axis loop coils and the plurality of Y-axis loop coils after the charging stage.

During the implementation, the high-frequency AC signal generator outputs the AC current to one or more Y-axis loop coils connected thereto via the coil switch at the charging stage, so as to generate an electromagnetic field at the one or more Y-axis loop coils due to the supplied AC current. When the electromagnetic stylus moves in the electromagnetic field, the electric energy may be accumulated in a resonance circuit of the electromagnetic stylus. After the charging stage, the high-frequency AC signal generator ceases to output the AC current to the one or more Y-axis loop coils, and the electric energy accumulated in the electromagnetic stylus is delivered from a coil at a tip of the electromagnetic stylus to the grid array electromagnetic induction layer through free oscillation of the resonance circuit. The position information detector detects the position information of the electromagnetic stylus on the grid array electromagnetic induction layer by detecting the voltages of the plurality of X-axis loop coils and the plurality of Y-axis loop coils.

In the electromagnetic touch display device of this embodiment, the control circuit may include an X-axis receiver, a Y-axis receiver, a coil switch, a high-frequency AC signal generator and a position information detector. First ends of the plurality of Y-axis loop coils are supplied with a reference voltage, and first ends of the plurality of X-axis loop coils are supplied with a reference voltage. The high-frequency AC signal generator is connected to a second end of one or more X-axis loop coils via the coil switch, and configured to output an AC current to the X-axis loop coils at a charging stage. The position information detector is connected to the second ends of the plurality of X-axis loop coils via the X-axis receiver and to second ends of the plurality of Y-axis loop coils via the Y-axis receiver, and configured to determine the position information of the electromagnetic stylus on the grid array electromagnetic induction layer by detecting voltages of the plurality of X-axis loop coils and the plurality of Y-axis loop coils after the charging stage.

During the implementation, the high-frequency AC signal generator outputs the AC current to one or more X-axis loop coils connected thereto via the coil switch at the charging stage, so as to generate an electromagnetic field at the one or more X-axis loop coils due to the supplied AC current. When the electromagnetic stylus moves in the electromagnetic field, the electric energy may be accumulated in a resonance circuit of the electromagnetic stylus. After the charging stage, the high-frequency AC signal generator ceases to output the AC current to the one or more X-axis loop coils, and the electric energy accumulated in the electromagnetic stylus is delivered from a coil at a tip of the electromagnetic stylus to the grid array electromagnetic induction layer through free oscillation of the resonance circuit. The position information detector detects the position information of the electromagnetic stylus on the grid array electromagnetic induction layer by detecting the voltages of the plurality of X-axis loop coils and the plurality of Y-axis loop coils.

In the electromagnetic touch display device of this embodiment, the control circuit may include an X-axis receiver, a Y-axis receiver, a coil switch, a high-frequency AC signal generator and a position information detector. First ends of the plurality of Y-axis loop coils are supplied with a reference voltage, and first ends of the plurality of X-axis loop coils are supplied with a reference voltage. The high-frequency AC signal generator is connected to a second end of one or more Y-axis loop coils via the coil switch and to a second end of one or more X-axis loop coils via the coil switch, and configured to output an AC current to the Y-axis loop coils and the X-axis loop coils at a charging stage. The position information detector is connected to the second ends of the plurality of X-axis loop coils via the X-axis receiver and to the second ends of the plurality of Y-axis loop coils via the Y-axis receiver, and configured to determine the position information of the electromagnetic stylus on the grid array electromagnetic induction layer by detecting voltages of the plurality of X-axis loop coils and the Y-axis loop coils after the charging stage.

During the implementation, the high-frequency AC signal generator outputs the AC current to one or more X-axis loop coils and one or more Y-axis loop coils connected thereto via the coil switch at the charging stage, so as to generate an electromagnetic field at the one or more X-axis loop coils and the one or more Y-axis loop coils due to the supplied AC current. When the electromagnetic stylus moves in the electromagnetic field, the electric energy may be accumulated in a resonance circuit of the electromagnetic stylus. After the charging stage, the high-frequency AC signal generator ceases to output the AC current to the one or more X-axis loop coils and one or more Y-axis loop coils, and the electric energy accumulated in the electromagnetic stylus is delivered from a coil at a tip of the electromagnetic stylus to the grid array electromagnetic induction layer through free oscillation of the resonance circuit. The position information detector detects the position information of the electromagnetic stylus on the grid array electromagnetic induction layer by detecting the voltages of the plurality of X-axis loop coils and the plurality of Y-axis loop coils.

To be specific, as shown in FIG. 1, a first end of the first X-axis loop coil 101 is supplied with a reference voltage, a first end of the second X-axis loop coil 102 is supplied with a reference voltage, and a first end of the third X-axis loop coil 103 is supplied with a reference voltage. A first end of the first Y-axis loop coil 111 is supplied with a reference voltage, a first end of the second Y-axis loop coil 112 is supplied with a reference voltage, and a first end of the third Y-axis loop coil 113 is supplied with a reference voltage. The control circuit includes a Y-axis receiver 12, an X-axis receiver 13, a coil switch 14, a high-frequency AC signal generator 15 and a position information detector 16. The high-frequency AC signal generator 15 is connected to a second end of the first Y-axis loop circuit 111 via the coil switch 14, and configured to output an AC current to the first Y-axis loop coil 111 at a charging stage. The position information detector 16 is connected to a second end of the first X-axis loop coil 101, a second end of the second X-axis loop coil 102 and a second end of the third X-axis loop coil 103 via the X-axis receiver 13, respectively, connected to the second end of the first Y-axis loop coil 111, a second end of the second Y-axis loop coil 112 and a second end of the third Y-axis loop coil 113 via the Y-axis receiver 12, respectively, and configured to determine the position information of the electromagnetic stylus (not shown) on the grid array electromagnetic induction layer by detecting voltages of the first X-axis loop coil 101, the second X-axis loop coil 102, the third X-axis loop coil 103, the first Y-axis loop coil 111, the second Y-axis loop coil 112 and the third Y-axis loop coil 113 after the charging stage.

Figure 2:
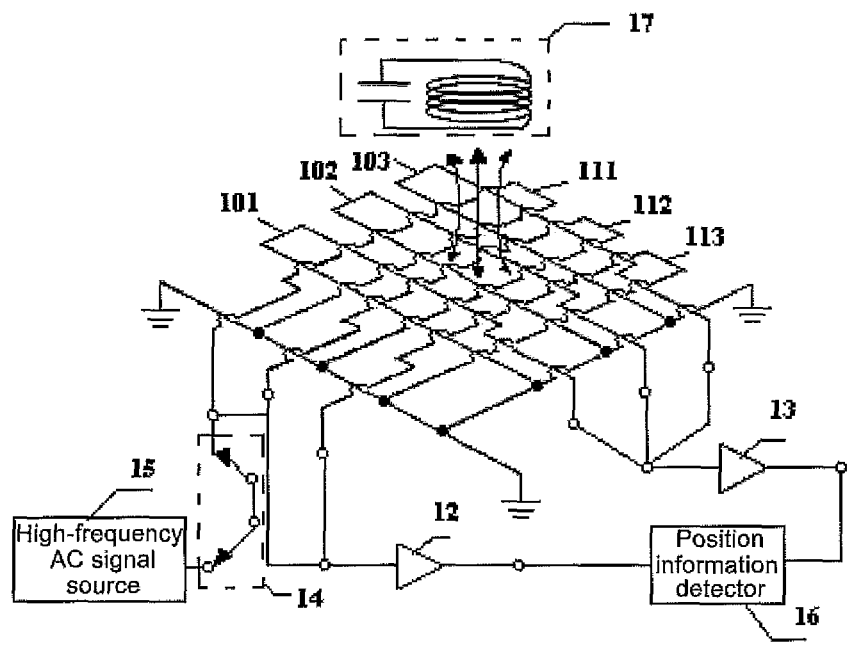
FIG. 2 is a schematic view showing a grid array electromagnetic induction layer, a control circuit and an electromagnetic stylus included in the electromagnetic touch display device according to another embodiment of the present disclosure.
Figure 3:
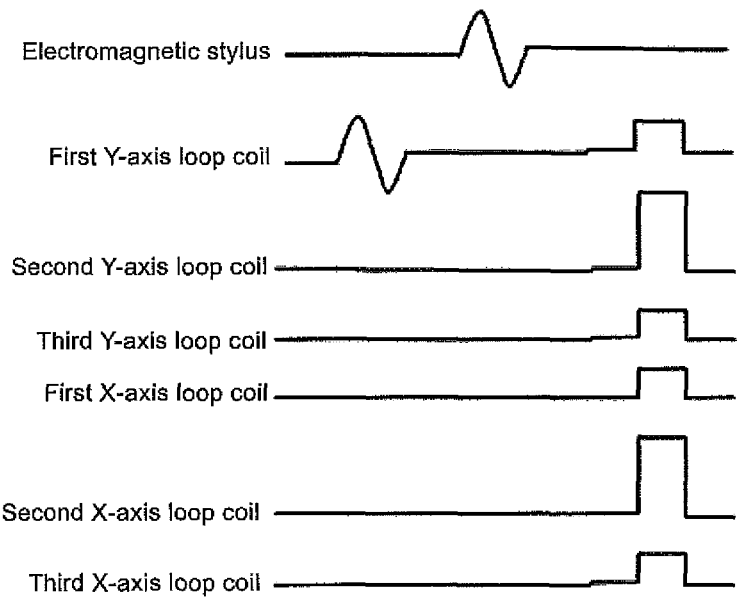
FIG. 3 is a view showing energy waveforms of the electromagnetic stylus, a first Y-axis loop coil, a second Y-axis loop coil, a third Y-axis loop coil, a first X-axis loop coil, a second X-axis loop coil and a third X-axis loop coil included in the electromagnetic touch display device according to an embodiment of the present disclosure.

During the implementation, as shown in FIGS. 2 and 3, when an electromagnetic stylus 17 is located at a junction between the second Y-axis loop coil 112 and the second X-axis loop coil 102, a resonance circuit in the electromagnetic stylus 17 releases the electric energy, and the first Y-axis loop coil 111, the second Y-axis loop coil 112, the third Y-axis loop coil 113, the first X-axis loop coil 101, the second X-axis loop coil 102 and the third X-axis loop coil 103 receive the electric energy and feed it back to the position information detector 16 for digital-to-analogue conversion. After calculation, the position information detector 16 finds that higher energy is received by the second Y-axis loop coil 112 and the second X-axis loop coil 102, so it determines that the electromagnetic stylus 17 is located at the junction between the second Y-axis loop coil 112 and the second X-axis loop coil 102.

In FIG. 2, when junctions between two of a Y-axis loop coil, an X-axis loop coil and a reference voltage output line are drawn as arcs, it means that the two of the Y-axis loop coil, the X-axis loop coil and the reference voltage output line are not connected to each other. When the junctions between two of the Y-axis loop coil, the X-axis loop coil and the reference voltage output lien are drawn as bold, black points, it means that the two of the Y-axis loop coil, the X-axis loop coil and the reference voltage output line are connected to each other.

The X-axis loop coil is insulated from the Y-axis loop coil, and an insulation layer may be arranged therebetween so as to insulate them from each other.

During the implementation, the control circuit is arranged on a printed circuit board (PCB), and the electromagnetic signal processing interface of the grid array electromagnetic induction layer is connected to the control circuit on the PCB via a flexible printed circuit (FPC).

The present disclosure further provides in an embodiment a method for manufacturing an electromagnetic touch display device, including a step of arranging a grid array electromagnetic induction layer on an array substrate or a color filter substrate.

The step of arranging the grid array electromagnetic induction layer on the array substrate includes:

forming a plurality of X-axis loop coils on a glass substrate of the array substrate;

forming a passivation insulation layer on the plurality of X-axis loop coils; and forming a plurality of Y-axis loop coils on the passivation insulating layer.

In this embodiment, the X-axis and Y-axis loop coils are formed on a glass substrate of the array substrate by a traditional process such as coating, exposing, developing, etching and removing, and subsequently the other elements are formed on the array substrate.

Figure 4:
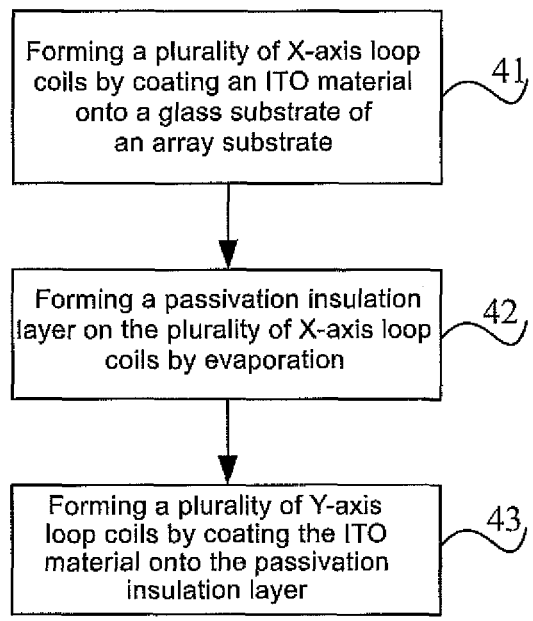
FIG. 4 is a flow chart of a method for manufacturing an electromagnetic touch display device according to an embodiment of the present disclosure.

During the implementation, as shown in FIG. 4, the step of forming the grid array electromagnetic induction layer on the array substrate includes:

Step 41: forming a plurality of X-axis loop coils by coating an ITO material onto the glass substrate of the array substrate;

Step 42: forming a passivation insulation layer on the plurality of X-axis loop coils by evaporation; and Step 43: forming a plurality of Y-axis loop coils by coating the ITO material onto the passivation insulation layer.

According to the electromagnetic touch display device and its manufacturing method of the present disclosure, the grid array electromagnetic induction layer is arranged on the array substrate or the color filter substrate of the display device, i.e., the electromagnetic induction layer is built inside the display device, so as to provide the display device with an electromagnetic touch function, without any need to add an electromagnetic induction layer at a back surface of the display device. As a result, it is able to prevent alignment offset of the external electromagnetic induction layer, thereby to perform the position control and touch control accurately.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An electromagnetic touch display device, comprising a display device and an electromagnetic stylus, wherein the display device comprises an array substrate, a color filter substrate, a grid array electromagnetic induction layer and a control circuit, wherein
the grid array electromagnetic induction layer is arranged on and in direct contact with a glass substrate of the array substrate or the color filter substrate, and
the control circuit is connected to the grid array electromagnetic induction layer and configured to detect position information of the electromagnetic stylus on the grid array electromagnetic induction layer,
wherein the grid array electromagnetic induction layer comprises a plurality of X-axis loop coils and a plurality of Y-axis loop coils insulated from the plurality of X-axis loop coils,
wherein the control circuit comprises an X-axis receiver, a Y-axis receiver, a coil switch, a high-frequency AC signal generator and a position information detector,
first ends of the plurality of Y-axis loop coils are supplied with a reference voltage, and first ends of the plurality of X-axis loop coils are supplied with a reference voltage,
the high-frequency AC signal generator is (i) connected to a second end of one or more Y-axis loop coils via the coil switch and configured to output an AC current to the Y-axis loop coils at a charging stage, or (ii) connected to a second end of one or more X-axis loop coils via the coil switch, and configured to output an AC current to the X-axis loop coils at a charging stage, or (iii) connected to a second end of one or more Y-axis loop coils via the coil switch and to a second end of one or more X-axis loop coils via the coil switch, and configured to output an AC current to the Y-axis loop coils and the X-axis loop coils at a charging stage.

2. The electromagnetic touch display device according to claim 1, wherein the plurality of X-axis loop coils and the plurality of Y-axis loop coils are formed on the array substrate.

3. The electromagnetic touch display device according to claim 2, wherein
the position information detector is connected to second ends of the plurality of X-axis loop coils via the X-axis receiver and to the second ends of the plurality of Y-axis loop coils via the Y-axis receiver, and configured to determine the position information of the electromagnetic stylus on the grid array electromagnetic induction layer by detecting voltages of the plurality of X-axis loop coils and the plurality of Y-axis loop coils after the charging stage.

4. The electromagnetic touch display device according to claim 3, wherein the control circuit is arranged on a printed circuit board, and an electromagnetic signal processing interface of the grid array magnetic induction layer is connected to the control circuit on the printed circuit board via a flexible circuit board.

5. The electromagnetic touch display device according to claim 2, wherein the control circuit is arranged on a printed circuit board, and an electromagnetic signal processing interface of the grid array magnetic induction layer is connected to the control circuit on the printed circuit board via a flexible circuit board.

6. The electromagnetic touch display device according to claim 1, wherein the plurality of X-axis loop coils and the plurality of Y-axis loop coils are formed on the color filter substrate.

7. The electromagnetic touch display device according to claim 6, wherein
the position information detector is connected to second ends of the plurality of X-axis loop coils via the X-axis receiver and to the second ends of the plurality of Y-axis loop coils via the Y-axis receiver, and configured to determine the position information of the electromagnetic stylus on the grid array electromagnetic induction layer by detecting voltages of the plurality of X-axis loop coils and the plurality of Y-axis loop coils after the charging stage.

8. The electromagnetic touch display device according to claim 6, wherein the control circuit is arranged on a printed circuit board, and an electromagnetic signal processing interface of the grid array magnetic induction layer is connected to the control circuit on the printed circuit board via a flexible circuit board.

9. The electromagnetic touch display device according to claim 1, wherein the control circuit is arranged on a printed circuit board, and an electromagnetic signal processing interface of the grid array magnetic induction layer is connected to the control circuit on the printed circuit board via a flexible circuit board.

10. A method for manufacturing an electromagnetic touch display device comprising a display device and an electromagnetic stylus, wherein the display device comprises an array substrate, a color filter substrate, a grid array electromagnetic induction layer and a control circuit,
the method comprising a step of arranging a grid array electromagnetic induction layer on and in direct contact with a glass substrate of an array substrate or a color filter substrate,
wherein the step of arranging the grid array electromagnetic induction layer comprises arranging a plurality of X-axis loop coils and a plurality of Y-axis loop coils insulated from the plurality of X-axis loop coils,
wherein the control circuit comprises an X-axis receiver, a Y-axis receiver, a coil switch, a high-frequency AC signal generator and a position information detector,
first ends of the plurality of Y-axis loop coils are supplied with a reference voltage, and first ends of the plurality of X-axis loop coils are supplied with a reference voltage,
the high-frequency AC signal generator is (i) connected to a second end of one or more Y-axis loop coils via the coil switch and configured to output an AC current to the Y-axis loop coils at a charging stage, or (ii) connected to a second end of one or more X-axis loop coils via the coil switch, and configured to output an AC current to the X-axis loop coils at a charging stage, or (iii) connected to a second end of one or more Y-axis loop coils via the coil switch and to a second end of one or more X-axis loop coils via the coil switch, and configured to output an AC current to the Y-axis loop coils and the X-axis loop coils at a charging stage.

11. The method according to claim 10, wherein the step of arranging the grid array electromagnetic induction layer on the array substrate comprises:
- forming the plurality of X-axis loop coils on a glass substrate of the array substrate;
- forming a passivation insulation layer on the plurality of X-axis loop coils; and
- forming the plurality of Y-axis loop coils on the passivation insulating layer.

12. The method according to claim 11, wherein
the step forming the plurality of X-axis loop coils on the glass substrate of the array substrate comprises forming the plurality of X-axis loop coils by coating an indium tin oxide (ITO) material onto the glass substrate, and
the step of forming the plurality of Y-axis loop coils on the passivation insulating layer comprises forming the plurality of Y-axis loop coils by coating an ITO material onto the passivation insulation layer.

13. The method according to claim 10, wherein the step of arranging the grid array electromagnetic induction layer on the color filter substrate comprises:
- forming the plurality of X-axis loop coils on a glass substrate of the color filter substrate;
- forming a passivation insulation layer on the plurality of X-axis loop coils; and
- forming the plurality of Y-axis loop coils on the passivation insulation layer.

14. The method according to claim 13, wherein
the step of forming the plurality of X-axis loop coils on the glass substrate of the color filter substrate comprises forming the plurality of X-axis loop coils by coating an ITO material onto the glass substrate, and
the step of forming the plurality of Y-axis loop coils on the passivation insulation layer comprises forming the plurality of Y-axis loop coils by coating an ITO material onto the passivation insulation layer.

* * * * *